Figure 1:
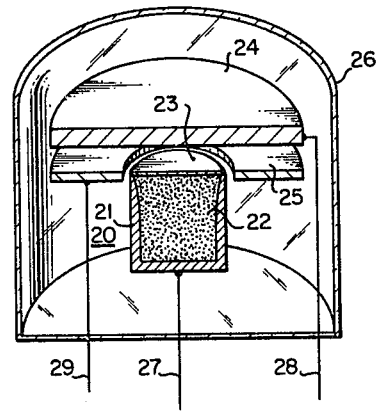

Oct. 25, 1966  G. A. HAAS  3,281,372
MATRIX EMITTER FOR THERMIONIC CONVERSION SYSTEMS
Filed Jan. 30, 1964  2 Sheets-Sheet 1

INVENTOR
GEORGE A. HAAS

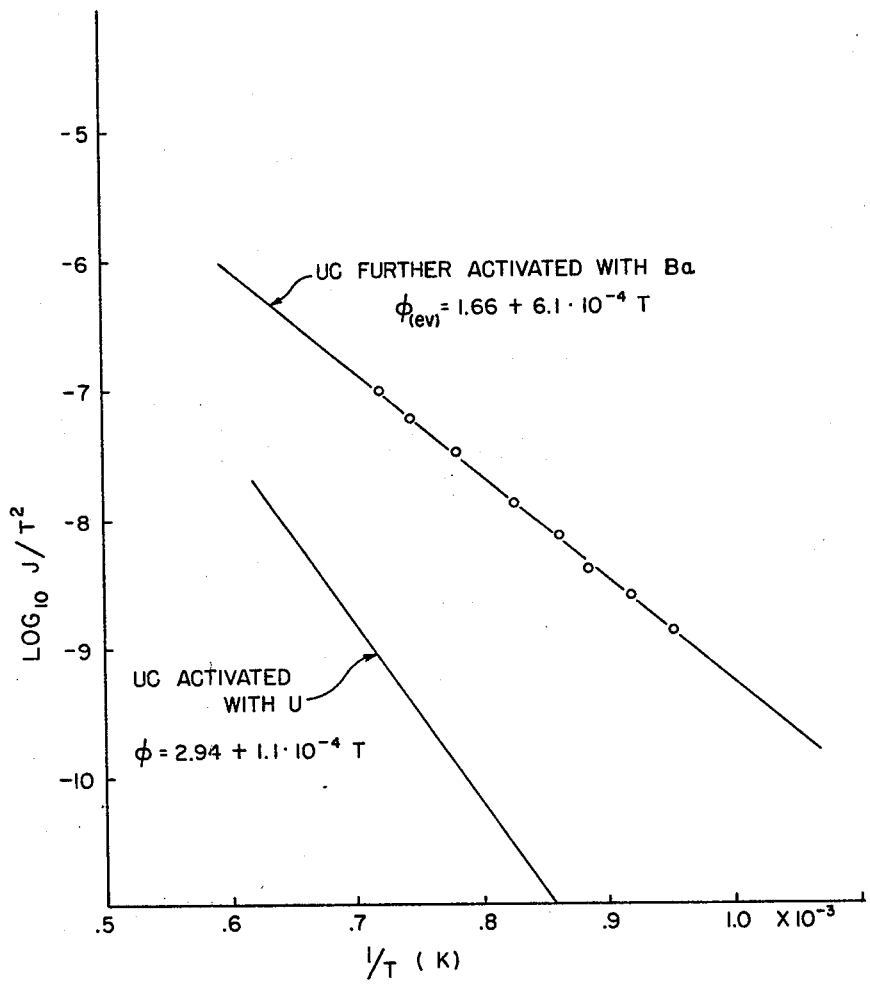

United States Patent Office 3,281,372
Patented Oct. 25, 1966

3,281,372
MATRIX EMITTER FOR THERMIONIC CONVERSION SYSTEMS
George A. Haas, Alexandria, Va., assignor to the United States of America as represented by the Secretary of the Navy
Filed Jan. 30, 1964, Ser. No. 341,466
3 Claims. (Cl. 252—301.1)

The invention described herein may be manufactured and used by or for the Government of the United States of America for governmental purposes without the payment of any royalties thereon or therefor.

This application is a continuation-in-part of application Serial No. 207,164, filed June 29, 1962, now Patent Number 3,121,048, for "Matrix Emitter for Thermionic Conversion Systems."

The present invention relates to a matrix type thermionic emitter which can be fission-heated in a neutron flux to provide high electron emissions.

Recent developments in the field of thermionic energy conversion has focused attention on the possibility that substantial electric power may be extracted by thermionic emission of electrons. Thermionic electron sources using a fissionable element in their composition have been proposed as a means of converting nuclear energy into electrical energy. The emitter substance is fission-heated in a neutron flux whereby electron emissions occur without the use of an electric filament current.

Thermionic converters are low voltage devices hence, to generate substantial amounts of power, a large number of electrons are required to flow from the hot emitter to a cold collector. Although previous proposed materials and structures have served to illustrate the general requirements of fission type emitters, they have not demonstrated the emission properties expected for energy conversion systems.

The present invention provides a matrix type emitter which incorporates in a single emitting structure both a fissionable material and a copious electron source. The presence of a fissionable element in the emitter composition acts as the heat source necessary for vaporizing electrons when said composition becomes activated in a neutron flux. The emitter in accordance with the present invention is capable of high electron emissions for a sustained period of operation, and may be utilized in an energy conversion system to achieve an electric power-producing reactor which converts fission heat directly into electrical energy.

The matrix emitter of the present invention has been found to be a highly efficient thermionic source as shown by substantially higher emissions and by its ability to operate at lower temperatures than previous emitters. The thermionic emitter contains a uranium compound, such as the carbide or the dioxide $UO_2$, which becomes heated by the neutron flux, for instance, near a nuclear reactor and the heat of fission boils off electrons from the emitter surface. A highly emissive film of active material which is formed on the surface provides for a much higher electron emission than that previously obtained from uranium compounds alone. Upon heating the matrix to temperatures of about 1200° K. or more, the active material which is finely dispersed throughout the emitter composition will diffuse to the surface at a very low rate to form the active film. The diffusing nature of the active material from within the matrix provides a completely fresh surface whenever the previous surface has been destroyed by ion bombardment or otherwise poisoned.

An object of the present invention is to provide a thermionically emissive structure having a novel emitter composition with superior emissive properties than in previous devices of this type.

Another object of this invention is to provide a matrix emitter which can operate effectively at a lower temperature to give a reasonable current.

A further object of the invention is to provide an improved fissionable matrix composition for use in low field applications, such as the thermionic energy converters.

A still further object of the invention resides in the provision of a matrix emitter in which there is a continually renewable active emissive surface during active operation of the converter.

Figure 2:
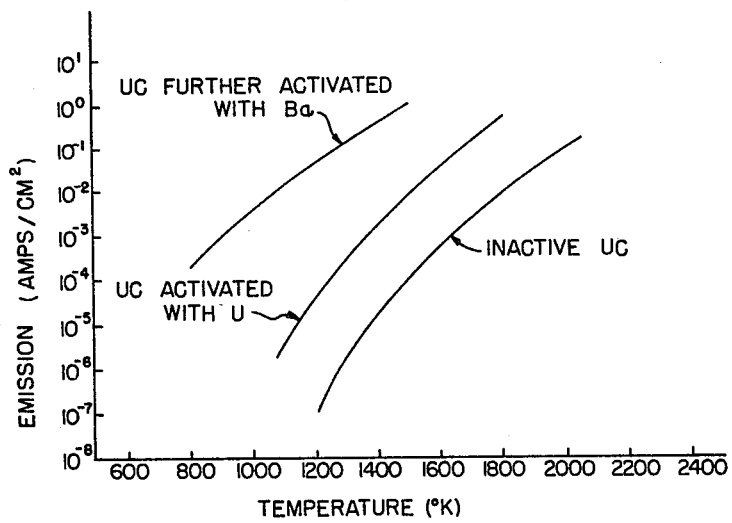

Other objects and features of the invention will become apparent to those skilled in the art as the disclosure is made in the following detailed description of a preferred embodiment of the invention and as illustrated in the accompanying drawings, in which:

FIG. 1 is a cross-sectional view in perspective of the thermionic emitter according to the present invention, and FIGS. 2 and 3 are graphic representations which indicate the performance characteristics of a preferred embodiment of the present invention.

Referring now to FIG. 1 of the drawings, the reference numeral 20 designates generally a thermionic energy converter which incorporates the teachings of the present invention. The matrix emitter or cathode in said converter includes a thin metal cup 21, formed of tantalum or other similar metal. In said cup is a matrix composition 22 formed of a mixture of powdered ingredients pressed into a binding form and fused to a solid mass. The matrix composition consists essentially of a fissionable compound such as, the monocarbide UC, the dioxide $UO_2$ or other compounds of the uranium family, and a barium compound, for example, barium oxide, barium silicate, barium calcium aluminate which have been found to be effective barium metal dispensers by undergoing a slow chemical reduction of said metal. Barium freed by chemical reduction forms a thin surface coating of barium metal.

The reducing action on the barium compound is influenced by the presence of a small amount of reducing agent interspersed in the matrix composition. The reducing action may be obtained from a slight excess of carbon atoms in the carbide UC or by the deliberate inclusion of carbon particles in the matrix. Reduction may also be achieved by means of other reducing agents mixed in the composition or in the cup structure 21. The cup metal itself is capable of effecting a slow reduction of the barium, suitable metals for this purpose being tantalum, tungsten, molybdenum and also by zirconium carbide within the cup or included in the matrix composition. The surface coating 23 on the emitter surface, shown in the drawing in an exaggerated thickness for purposes of illustration, provides an improved emitting surface, one that can be continuously replenished by further release of barium from the matrix composition.

A collector plate or anode 24 is spaced from said emitter, and a guard ring 25 confines electron paths to the area of said plate. An envelope 26 confines the assembled parts into a highly evacuated space. Lead-in conductors 27–29 provide externally accessible terminals. The emitter is kept hot enough to emit electrons thermionically, while the collector plate is kept relatively cool. Electrons boiling off the emitter flow to the collector and out through lead 28 to an external load and back through lead 27. The lead 29 is connected to the guard ring 25 to provide a uniform field.

Uranium compounds do not in themselves have good electron emission properties, but they are substantially activated by a barium film on their surface. The present invention is exemplified by the improvement noted for the uranium carbide matrix which incorporates barium film and which retains additional barium in the matrix for a slow migration of the metal for a further replenishment of the film. Barium compounds which may be used in the present matrix emitter include the oxide, BaO, the hydroxide $Ba(OH)_2$, the nitrate, $Ba(NO_3)_2$, the sulfate, $BaSO_4$, the carbonate, $BaCO_3$ and the barium metallates formed of metal-oxygen anions such as the tungstate, rhenate, hafnate, niobate, aluminate, etc. A particularly useful compound of the latter type is the barium calcium aluminate which is capable of prolonging and stabilizing the release of the barium. The calcium in the aluminate has been found to lower the evaporation rate of barium and thus aiding in prolonging the operable life of the matrix emitter. A suitable aluminate may be formed by mixing together 0.3 mole of $CaCO_3$, 5 moles of $BaCO_3$ and 2 moles of $Al_2O_3$ and then firing said mixture in air to fusion. The barium compounds may be used in a wide range of concentrations; the effective range being between 5 to 20 percent by weight of the matrix mixture prior to fusion. Preferably, the uranium and barium compound are mixed together in fine powder form in a weight ratio of about 9 to 1, respectively. The matrix mixture may also include a small amount of reducing agent, as mentioned previously, in an amount, say, of approximately 0.1 to 1 percent of the total weight.

The inclusion of a barium generating or dispensing compound such as the oxide, hydroxide or carbonate is not necessarily restricted to percentages of 5–20% by weight as noted above, but may be included therein in increased amounts as high as 50% by weight, the higher concentrations being limited by the ability of the matrix to be fission-heated.

The matrix emitter is formed by combining together dry powders of uranium and barium compounds. Uranium carbide and barium calcium aluminate, for example, are ground into powders that pass a 400 mesh U.S. sieve. Since uranium carbide is pyrophoric as well as radioactive, the process must be performed in a dry, inert atmosphere. The powder mixture is placed in the thermionic converter assembly and enclosed within an envelope, as shown in FIG. 1. The converter is then evacuated and sealed off leaving the thermionic converter under vacuum.

The good thermionic properties of the present emitter can be inferred from the oriented dipole which is believed to be present on the emissive surface. In the specific example mentioned above, the properties of the uranium carbide are enhanced by free uranium atoms which form on the surface; they are further enhanced by an absorbed thin layer or monolayer of barium. A free barium layer is formed on uranium by heating the matrix mixture, in the vicinity of a nuclear reactor, the heat of fission decomposing small amounts of the barium calcium aluminate. The barium spreads out and covers the surface as an absorbed film to provide the dipole arrangement of a more electropositive metal over a less electropositive one. The external surface now constitutes an oriented dipole in which there is substantial reduction of the work function of the uranium carbide.

An initial activation period improves the emission density of the emitter. The temperature is retained near 1200° K. and allowed to increase slowly as the electron emission rises and finally stabilizes as the temperature is increased to about 1400° K. The emission current rises and stabilizes in about 1 hour. The improved emitter may operate effectively at a temperature in the range 800–1550° K. to provide substantially high electron emissions. Thus, the emitter is operable in a range of temperatures which heretofore has not been possible with other fission-heated emitters. Moreover, fission-type emitters have not been anticipated that can be operated at such low range of temperatures.

The improvements achieved by means of the present invention are now indicated graphically with reference to FIG. 2, in which the current output of the UC and barium surface is compared with the carbide structure having no active surface and with the carbide structure having essentially a uranium monolayer surface. The improvement achieved by the matrix emitter is in the order of 3 in magnitude, which is at least a thousand fold increase in emissions over the other emitters.

FIG. 3 shows the characteristic Richardson plots for a UC matrix emitter with a barium emitting surface and for a UC emitter with a uranium emitting surface. From the slope and intercept of said plots, values for $\phi$, representing the effective work function, or the amount of energy necessary for removing an electron from the surface, can be readily determined. For the uranium surface at 1250° K. about 3.08 e.v. are required to remove an electron, while the barium-activated surface at 1250° K. requires about 2.42 e.v.

As a result of the present invention, a fissionable matrix emitter provides substantially higher electron emissions. A matrix composition in accordance with this invention affords a longer operable life for thermionic converters at lower operating temperature than the uranium compounds previously considered for this purpose.

The foregoing is considered as illustrative only of the principle of the invention. Further, since numerous matrix emitter modifications and changes will occur to those skilled in the art, it is not desired to limit the invention to the exact compositions and method of construction shown and described and accordingly all suitable modifications and equivalents may be resorted to, falling within the scope of the appended claims.

What is claimed is:
1. A matrix emitter for thermionic conversion systems comprising;
   a pressed powder mixture of a fissionable material which becomes heated in a neutron flux,
   a barium compound selected from the group of compounds consisting of barium hydroxide and barium carbonate in an amount not in excess of about 50% based on the weight of said mixture, said compound being capable of releasing barium at thermionic temperatures to form a surface film of barium on said emitter, and
   a reducing agent for said barium compound, said agent being present in said mixture in an amount in the range of from about 0.1% to about 1% based on the weight of said mixture.
2. A matrix emitter for thermionic conversion systems comprising:
   a sintered composition of a fissionable material which becomes heated in a neutron flux,
   a barium compound selected from the group of compounds consisting of barium hydroxide and barium carbonate in an amount not in excess of about 50% based on total weight of said composition, said compound being capable of releasing barium at thermionic temperatures to form a surface film of barium on said emitter, and
   a reducing agent for said barium compound, said agent being present in said composition in an amount in the range of from about 0.1% to about 1% based on the weight of said composition.
3. A matrix emitter in accordance with claim 2 wherein said fissionable material consists essentially of uranium carbide.

References Cited by the Examiner
UNITED STATES PATENTS
3,121,048   2/1964   Haas _____ 252—301.1

BENJAMIN R. PADGETT, *Primary Examiner.*

LEON D. ROSDOL, *Examiner.*

L. A. SEBASTIAN, *Assistant Examiner.*